US00RE34628E

United States Patent [19]

Fujishiro et al.

[11] E Patent Number: Re. 34,628

[45] Reissued Date of Patent: Jun. 7, 1994

[54] AUTOMOTIVE SUSPENSION SYSTEM WITH VARIABLE DAMPING CHARACTERISTICS

[75] Inventors: Takeshi Fujishiro, Yokohama; Sadahiro Takahashi; Takanobu Kaneko, both of Yokosuka, all of Japan

[73] Assignee: Nissan Motor Company, Limited, Yokohama, Japan

[21] Appl. No.: 487,024

[22] Filed: Feb. 28, 1990

Related U.S. Patent Documents

Reissue of:

[64] Patent No.: 4,696,489
Issued: Sep. 29, 1987
Appl. No.: 818,265
Filed: Jan. 13, 1986

[30] Foreign Application Priority Data

Jan. 14, 1985 [JP] Japan ..... 60-4791

[51] Int. Cl.[5] ..... B60G 17/04

[52] U.S. Cl. ..... 280/707; 280/703; 280/840

[58] Field of Search ..... 280/707, 703, 702, 840, 280/6.1, 6.12; 180/100, 103, 104; 188/299

[56] References Cited

U.S. PATENT DOCUMENTS

| | | | |
|---|---|---|---|
| 3,807,678 | 4/1974 | Karnopp et al. | 248/358 R |
| 3,945,664 | 3/1976 | Hiruma | 280/703 |
| 3,995,883 | 12/1976 | Glaze | 280/707 |
| 4,154,461 | 5/1979 | Schnittger | 280/710 |
| 4,212,484 | 7/1980 | Fujii | 280/707 |
| 4,349,077 | 9/1982 | Sekiguchi et al. | 280/6.12 |
| 4,401,310 | 8/1983 | Ishikawa et al. | 280/6.1 |
| 4,491,207 | 1/1985 | Boonchanta et al. | 188/299 |
| 4,526,401 | 7/1985 | Kakizaki et al. | 280/707 |
| 4,528,894 | 7/1985 | Crosby | 91/12 |
| 4,600,215 | 7/1986 | Kuroku et al. | 280/707 |
| 4,616,848 | 10/1986 | Sugasawa et al. | 280/707 |

OTHER PUBLICATIONS

"Comparison of Analytical and Experimental Results for a Semi-Active Vibration Isolator", Krasnicki et al, pp. 69-76.

"Heave Mode Dynamics of a Tracked Air Cushion Vehicle . . . " by Margolis et al, 1975, pp. 399-407.

The Experimental Performance of an On-Off Active Damper by Krasnick et al.

Vibration Control Using Semi-Active Force Generators by Crosby et al.

An experimental comparison between semi-active . . . by Hrovat et al, 1981 Int. J. of Vehucke Design, vol. 2, No. 3.

Semi-Active Control of Wheel Hop in Ground Vehicles by Margolis, Vehicle System Dynamics, 12, 1983, pp. 317-330.

The Active Damper-a New Concept for Shock and Vibration Control by Crosby, Bulletin 43, Jun. 1973.

*Primary Examiner*—Kenneth R. Rice
*Attorney, Agent, or Firm*—Foley & Lardner

[57] ABSTRACT

In order to ensure riding comfort and driving stability in an automotive suspension system, the nature of the effect of the damping force generated by the suspension system is observed. When the damping characteristics of the suspension system are too hard, resulting in amplification of vibrations in the suspension system, the damping characteristics are softened to ensure satisfactory riding comfort. Therefore, according to the present invention, an automotive suspension system has variable damping characteristics which depend on the nature of the damping force produced in response to bounding and/or rebounding motion of the vehicle so as to optimize damping characteristics to achieve both riding comfort and driving stability. In the preferred embodiment, a suspension control system uses the vibration frequency of a sprung mass and the relative speed between the sprung mass and an unsprung mass as control parameters representing the nature of damping force.

26 Claims, 12 Drawing Sheets

ROAD SURFACE
UP
0
DOWN
TIME

VEHICLE BODY DISPLACEMENT XA
UP
0
DOWN
O − + − + O
ẊA
t2 t4 t6 t8 t10

RELATIVE DISPLACEMENT XR
EXPANSION
a
XRO
−a
COMPRESSION
ẊR O + − + − + − O
t1 t3 t5 t6 t9 t11 t12

DAMPING CHARACTERISTICS
HARD
SOFT
t1 t2 t3 t4 t5 t6 t7 t8 t9 t10 t11 t12

AUTOMOTIVE SUSPENSION SYSTEM WITH VARIABLE DAMPING CHARACTERISTICS

Matter enclosed in heavy brackets [ ] appears in the original patent but forms no part of this reissue specification; matter printed in italics indicates the additions made by reissue.

BACKGROUND OF THE INVENTION

The present invention relates generally to an automotive suspension system with variable damping characteristics providing both driving stability and riding comfort. More specifically, the invention relates to a system controlling the variable damping characteristics of an automotive suspension system such that the damping forces against bounding and/or rebounding will not serve to amplify vibrations at least of the sprung mass.

Japanese Patent First Publication No. (Tokkai Sho.) 50-83922, published on Jul. 7, 1980, discloses an electronically controlled automotive suspension system. In the disclosed system, the relative displacement between the sprung mass and the unsprung mass and the acceleration of the sprung mass are detected. Based on the detected relative displacement, a reference value for the sprung mass acceleration is derived for comparison with the detected acceleration value. Control is performed to minimize the difference between the detected acceleration value and the reference value so as to improve riding comfort.

In such conventional suspension control system, the reference value derived on the basis of the relative displacement of the sprung mass and unsprung mass has to be small enough as to ensure good riding comfort. This, on the other hand, results in an excessively soft suspension, which degrades shock absorbing ability and thus results in reduced driving stability.

Consequently, although the prior proposed suspension control system may improve riding comfort to a certain extent, it does not satisfy the requirement for the better riding comfort while ensuring good driving stability.

SUMMARY OF THE INVENTION

Therefore, it is an object of the present invention to provide an automotive suspension system which assures good riding comfort with a sufficient level of driving stability.

In order to ensure riding comfort and driving stability in an automotive suspension system, the effect of the damping force generated by the suspension system must be observed and taken into account. For instance, if the damping characteristics of the suspension system is so hard that it tends to amplify vibrations of the suspension system, the damping characteristics must be softened to provide a satisfactory level of riding comfort. Therefore, according to the present invention, an automotive suspension system has variable damping characteristics which depend on the nature of the damping force produced in response to bounding and/or rebounding motion of the vehicle so as to optimize damping characteristics to achieve both riding comfort and driving stability.

In the preferred embodiment, a suspension control system uses the vibration frequency of a sprung mass and the relative speed between the sprung mass and a unsprung mass as control parameters representing the nature of the damping force.

It should be noted that, throughout the disclosure, the phrase "nature of the damping force" will refer to the tendency of the damping force to either amplify or absorb vertical oscillations.

According to one aspect of the invention, a suspension control system for an automotive vehicle comprises a vehicular suspension system with damping characteristics variable at least between a first harder suspension mode and a second softer suspension mode, a first sensor means for monitoring vertical displacement of a vehicle body within the gravity field and producing a first sensor signal indicative of the vertical speed of the vehicle body, a second sensor means for monitoring relative distance between the vehicle body and a vehicular wheel assembly and producing a second sensor signal indicative of the relative speed between the vehicle body and the wheel assembly, a controller responsive to the first and second sensor signals for predicting the effect of damping characteristics of the suspension system, selecting the effect from between a first condition in which damping characteristics act to amplify vehicle body vibrations and a second condition in which damping characteristics of the suspension system act to absorb vehicle body vibrations, the controller actuating the vehicular suspension system to the second softer suspension mode when the first condition is predicted and into the first harder suspension mode when the second condition is predicted.

In the preferred embodiment, the first sensor means comprises a sensor adapted to detect acceleration of the vehicle body and produce an acceleration indicative signal. The second sensor means comprises a sensor adapted to monitor relative displacement between the vehicle body and the wheel assembly, an integrator for integrating the relative displacement indicative output of the sensor and an arithmetic means for deriving the relative speed based on the integrated value by differentiating the integrated value.

The suspension system comprises a hydraulic shock absorber with damping characteristics variable at least between the first mode and the second mode.

Preferably, the hydraulic shock absorber has upper and lower fluid chambers filled with a working fluid and of variable volumes according to a piston stroke, the shock absorber being provided with a flow control value which is operable in either one of a first mode position. in which it restricts the rate of flow of working fluid between the upper and lower fluid chambers to a minimum rate, and a second mode position in which it allows fluid flow between the chambers at a maximum rate.

As an alternative, the suspension system may comprise a stabilizer with stiffness variable at least between the first mode and the second mode or a pneumatic spring means exerting a pneumatic damping force variable at least between the first mode and the second mode.

According to another aspect of the present invention, in a automotive suspension system with damping characteristics variable at least between a first harder suspension mode and a second softer suspension mode, a process for suppressing vibration of a vehicle body comprising the steps of: detecting the vertical speed of the vehicle body, detecting the relative speed between the vehicle body and a vehicular wheel assembly, predicting the effect of damping force produced by the suspension system based on the vehicle body speed and the relative speed, the effect being selected from between a first condition in which damping characteristics act to amplify vehicle body vibrations, and a second condition in which damping characteristics of the suspension system act to absorb vehicle body vibrations, and actuating the vehicular suspension system to the second softer suspension mode when the first condition is detected, and into the first harder suspension mode when the second condition is detected.

In the preferred procedure, the first condition is predicted when the vehicle body speed indicative value and the relative speed indicative value indicate action in the same direction and the second condition is predicted when the vehicle body speed indicative value and the relative speed indicative value indicate action in opposite directions.

DESCRIPTION OF THE PREFERRED EMBODIMENT

Figure 1:
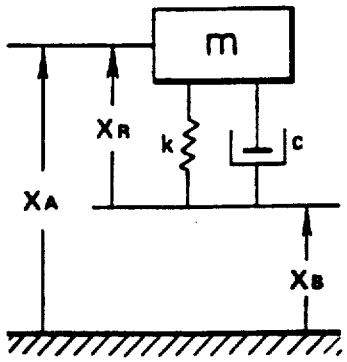
FIG. 1 is a diagram of the dynamics of a system comprising an sprung mass and a unsprung mass for explanation of the fundamental idea of the present invention.

Before describing the preferred embodiment of an automotive suspension system according to the present invention, the fundamental idea of the present invention will be described hereafter with reference to FIG. 1 in order to provide a foundation for understanding of the following description of the preferred embodiment of the invention. In FIG. 1, m represents the weight of the sprung mass, k represents the spring constant of a suspension spring, c represents the damping coefficient of a shock absorber, $X_A$ represents the displacement of the sprung mass, $X_B$ represents the displacement of the unsprung mass, and $X_R$ represents the relative displacement between the sprung mass and the unsprung mass. Since vibration of the sprung mass may affect riding comfort of the vehicle to a significant extent and vibration of the unsprung mass may not significantly affect riding comfort, the weight of the unsprung mass, the spring constant of the tires and other parameters which have little effect on riding comfort are disregarded.

Given the aforementioned conditions, the vibration system can be generally expressed by the following formula:

$$m\ddot{X}_A + c\dot{X}_R + kX_R = 0 \quad (1)$$

The foregoing formula can be rewritten as $$m\ddot{X}_A + c\dot{X}_4 + kX_4 = c\dot{X}_B + kX_R \quad (2)$$

By multiplying $X_4$ to the equation (2), the following equation is obtained:

$$d/dt \times (m/2 \times \dot{X}_A^2 + k/2 \times X_R^2) = -(c\dot{X}_R + kX_R)\dot{X}_B - c\dot{X}_R^2 \quad (3)$$

Given that the kinetic energy V of the sprung mass is ($V = m/2 \times \dot{X}_A^2$), the potential energy U of the sprung mass is ($U = k/2 \times X_R^2$) an external force Wf applied from outside of the vibration system in a unit time is ($Wf = -(c\dot{X}_R + kX_R) \times X_B$), and the force Wc discharged from the vibration system to outside in an unit time is ($Wc = c \times \dot{X}_R^2$).

Given the above assumptions, the equation (3) set forth above can be modified to read:

$$d/dt \times (V + U) = Wf - Wc \quad (4)$$

The equation (4) can also be modified to read:

$$d/dt \times (V + U) = -kX_R \times \dot{X}_B - c\dot{X}_R \times (\dot{X}_R + \dot{X}_B) \quad (5)$$
$$= -k\dot{X}_R \times \dot{X}_B - c\dot{X}_R \times \dot{X}_4$$

If equation (5) is solved for the element ($c\dot{X}_R \times \dot{X}_4$), which is representative of behavior of the shock absorber, the direction of the effect of the damping force can be recognized by checking the sign of the resulting value. For instance, if ($\dot{X}_A \times \dot{X}_R > 0$), it is recognized that the sprung mass is moving upward ($\dot{X}_4$ is plus) and the damping force of the shock absorber is directed upward ($\dot{X}_R$ is minus). The damping force of the shock absorber thus acts to amplify oscillation of the sprung mass. Similarly, when the sprung mass moves downward ($\dot{X}_4$ is minus) and the relative speed $\dot{X}_R$ of the sprung mass and the damping force of the shock absorber are directed downward ($\dot{X}_R$ is plus), the damping force of the shock absorber is again acting to amplify vibrations of the sprung mass.

On the other hand, when ($\dot{X}_A \times \dot{X}_R > 0$), the sprung mass is moving upward ($\dot{X}_A$ is pulse) and the damping force of the shock absorber is directed downward ($\dot{X}_R$ is plus), or the sprung mass is moving downward ($X_4$ is minus) and the damping force of the shock absorber is directed upward ($\dot{X}_R$ is minus). The damping force of the shock absorber thus acts to damp vibration of the sprung mass.

Therefore, by detecting whether the damping force of the shock absorber tends to damp or amplify vibrations of the sprung mass, and controlling the suspension system based on the result, riding comfort can be improved. For instance, according to the idea of the present invention. When the damping force of the suspension system acts to amplify vibration, the suspension system is softened in order to minimize amplification of the vibration of the sprung mass for riding comfort. On the other hand, when the damping force acts to absorb vibration, the suspension will be hardened to obtain optimal vibration absorbing characteristics and better driving stability.

In practice, if, upon solving for the aforementioned element ($c\dot{X}_R \times \dot{X}_A$), one of or both of the components are zero, the suspension system is generally softened for better riding comfort.

Figure 2:
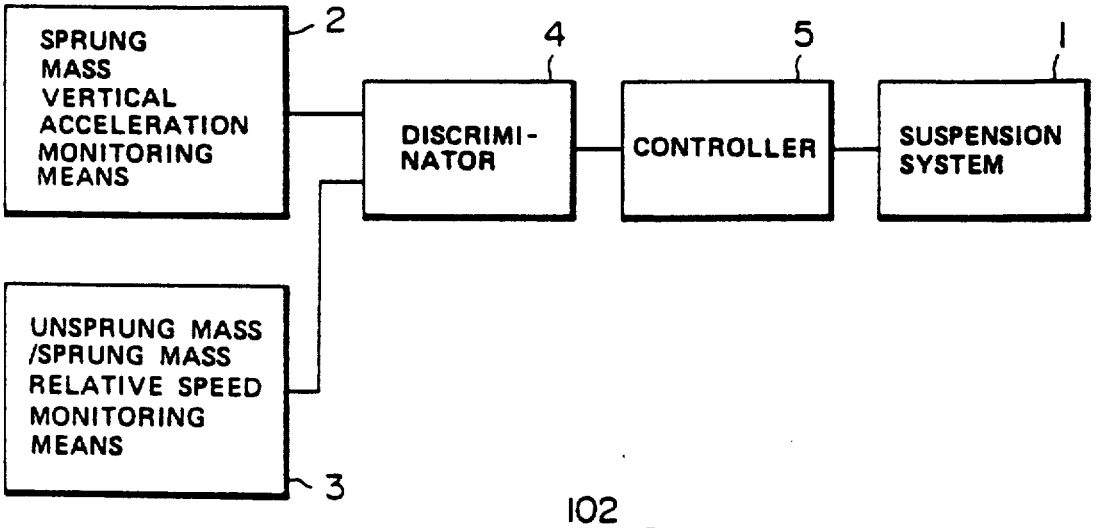
FIG. 2 is a schematic block diagram of the preferred embodiment of a suspension control system according to the present invention.

FIG. 2 schematically show a suspension control system implementing the process of suspension control set forth above. The suspension control system according to the present invention, generally comprises an sprung mass vertical velocity monitoring means 2 and a unsprung mass/sprung mass relative speed monitoring means 3. The sprung mass vertical velocity monitoring means 2 is designed to monitor acceleration of the sprung mass and produce a sprung mass speed indicative signal. The sprung mass in this case comprises a vehicle body. The sprung mass speed signal is, in practice, representative of the vertical oscillation frequency of the vehicle body and will be referred to as "vehicle body vertical velocity signal" in the ensuing disclosure of the preferred embodiments. The unsprung mass/sprung mass relative speed monitoring means 3 monitors the relative motion of the unsprung mass and sprung mass and produces a unsprung mass/sprung mass relative speed indicative signal which will be referred to as "relative speed indicative signal" in the ensuing disclosure of the preferred embodiments.

The sprung mass vertical velocity monitoring means 2 and the unsprung mass/sprung mass relative speed monitoring means 3 are connected for output to a discriminator 4. The discriminator receives the sprung mass speed indicative signal from the sprung mass vibration monitoring means 2 and the unsprung mass/sprung mass relative indicative signal from the unsprung mass/sprung mass relative speed monitoring means 3 and judges the effect of the damping force of the suspension system in the manner set forth above. When the damping force of the suspension system tends to amplify the sprung mass vibration, the discriminator 4 feeds a discriminator signal indicative thereof. A controller 5 responds to this discriminator signal by ordering the suspension system to soften its damping characteristics. On the other hand, when the damping force tend to absorb vibration of the sprung mass, the discriminator 4 outputs a discriminator signal indicative thereof. The controller responds to this discriminator signal by ordering the suspension system to harden its damping characteristics.

Figure 3:
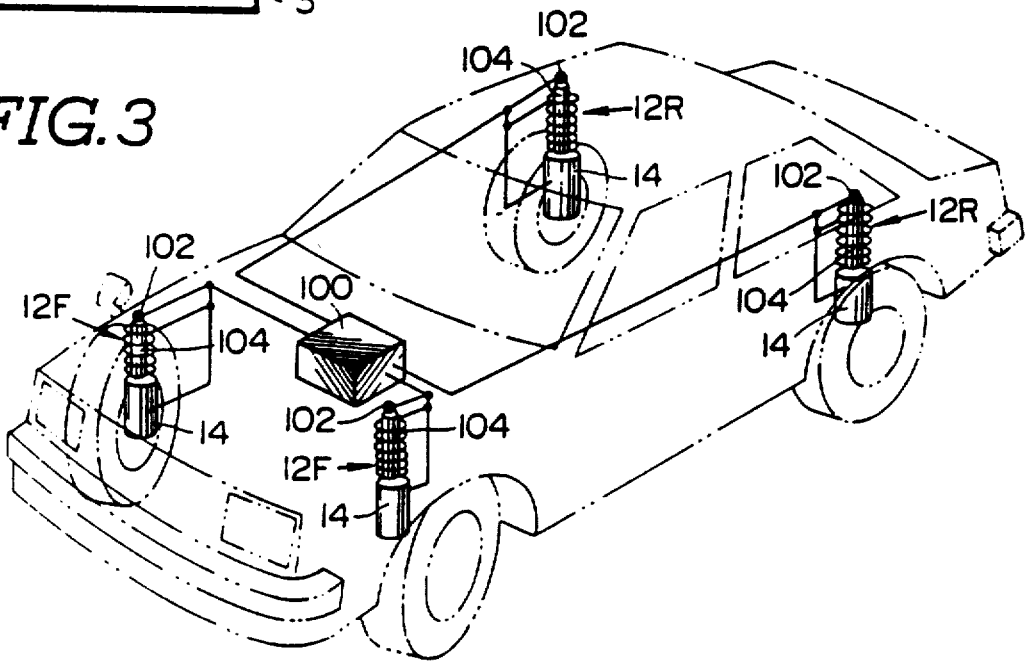
FIG. 3 is a perspective illustration of a vehicle highlighting essential elements of a vehicle suspension system with a variable damper to which the preferred embodiments of a shock absorbing characteristics control system are applied.

Referring now to FIG. 3, the first embodiment of a suspension control system, according to the invention, has front and rear suspension including front and rear suspension struts 12F and 12R. Each of the front and rear suspension struts 12F and 12R includes a variable shock absorber 14 with damping characteristics variable at least between HARD mode and SOFT mode. In the HARD mode, the shock absorber 14 produces a higher shock absorbing or damping force to increase the overall stiffness of the suspension. On the other hand, in SOFT mode, the shock absorber 14 produces a lower shock absorbing force.

The shock absorber 14 is connected to a driver circuit 16 which is, in turn, connected to a controller 100. The controller selects the proper mode of the shock absorber on the basis of one or more preselected suspension control parameters. The driver circuit 16 is responsive to a suspension control signal produced by the controller 100 to operate the shock absorber 14 to the one of the HARD and SOFT modes selected by the controller. In accordance with the shown embodiment, the controller 100 is connected for input from an accelerometer 102 and stroke sensors 104, which are associated with respective suspension struts 12F and 12R. The accelerometer 102 monitors vertical acceleration of the vehicle body acting as the unsprung mass and produces an acceleration indicative signal $S_a$ having a value representative of the monitored acceleration $\ddot{X}_A$. The stroke sensor 104 monitors the relative displacement between the vehicle body and a wheel assembly acting as the unsprung mass, and produces a stroke indicative signal $S_R$ having a value representative of the relative displacement $X_R$.

Figure 4:
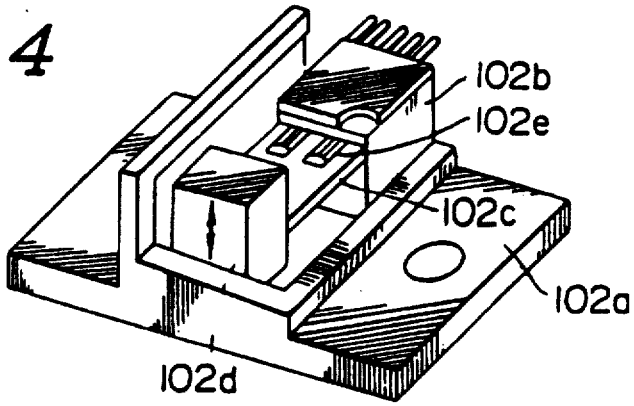
FIG. 4 is a perspective view of an accelerometer employed in the preferred embodiment of the suspension control system of FIG. 3 and serving as means for monitoring vertical velocity of a vehicle body acting as an sprung mass.

FIG. 4 shows the preferred embodiment of an accelerometer 102 employed in the suspension control system of FIG. 3 in detail. The accelerometer 102 is mounted in a strut housing (not shown) of the vehicle body by way of a mount 102a and one or more bolts. A sensor body 102b is fixed to the mount 102a and supports a sensor strip 102c. The sensor strip 102c extends from the sensor body 102b to form a centilever. An inertial weight or mass 102d is fixed to the free end of the sensor strip 102c. One or more strain gauges 102e are fixedly mounted on the sensor strip 102c for vibration therewith.

The sensor strip 102c is made of a resiliently deformable material and is designed to vibrate according to the moment of inertia of the inertial weight 102d and the bounding and rebounding motion of the vehicle body.

The strain gauges 102e are designed to monitor deformation of the sensor strip 102c and produce a signal indicative of the magnitude of deformation of the sensor strip, which signal serves as the acceleration indicative signal $S_a$. The acceleration indicative signal $S_a$ is output to the controller 100 through leads 102f.

The preferred embodiment of the stroke sensor 104 is associated with the shock absorber 14 and designed to monitor displacement of a piston rod 32 relative to a shock absorber cylinder 20. The preferred embodiment of the stroke sensor 104 comprises an electrostatic capacitance sensor, the electrostatic capacitance C of which depends on the piston rod 32 stroke position. The electrostatic capacitance C can be calculated from the following equation:

$$C = 2\pi\epsilon lx/\ln(b/a)$$

where $\epsilon$ is a constant:

lx is the length of the piston rod 32 in the shock absorber cylidner 20;

ln is the overall length of the piston rod;

a is the diameter of the piston rod 32; and b is the inner diameter of the shock absorber cylinder.

Figure 5:
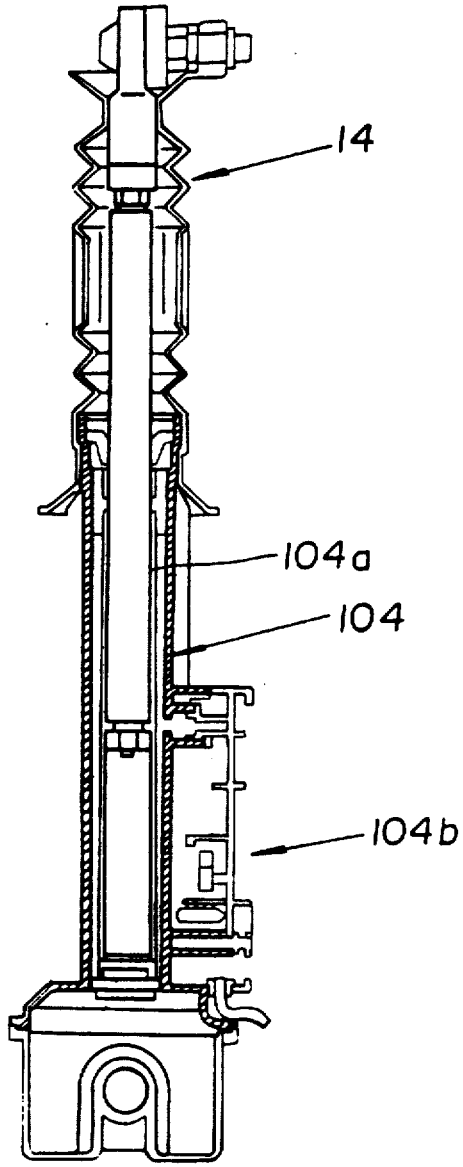
FIG. 5 is a fragmentary illustration of a shock absorber incorporating a stroke sensor employed in the preferred embodiment of the suspension control system of FIG. 3 and serving as means for monitoring relative displacement between the vehicle body and wheel assembly.

As shown in FIG. 5, in which a shock absorber associated with the preferred embodiment of the stroke sensor 104 is explanatorily and fragmentarily illustrated to show the construction of the stroke sensor. As will be appreciated from FIG. 5, the piston 32 and the shock absorber cylinder 20 both serve as ground electrodes. A sensor electrode 104a opposes the outer periphery of the piston rod 32 and the inner periphery of the shock absorber cylinder 20. The sensor electrode 104a is connected to a resistance controlled (RC) oscillator 104b, the pulse period of which depends upon the electrostatic capacitance between the sensor electrode 104a and the ground electrodes constituted by the piston rod 32 and the shock absorber cylinder 20.

Figure 6:
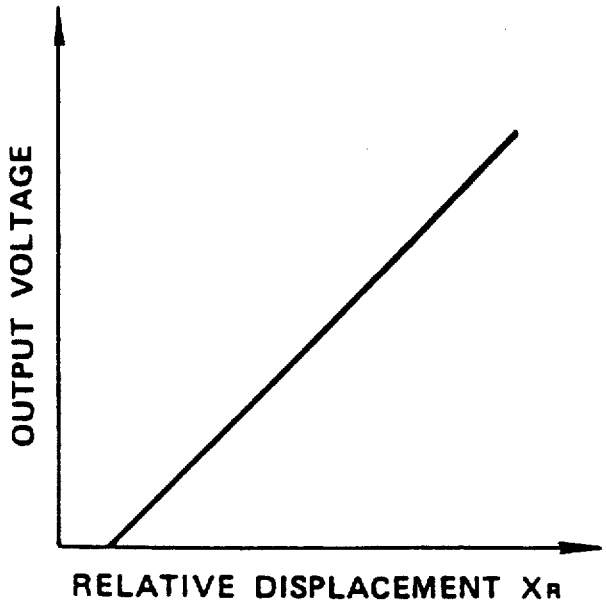
FIG. 6 is graph of the relationship between relative displacement between the vehicle body and wheel axle and a sensor output voltage indicative thereof.

The stroke sensor 104 is connected to a frequency-voltage converter (see FIG. 9) in the suspension control system, which will be described in detail later. The frequency-voltage converter, converts the frequency signal from the stroke sensor into an analog signal having a voltage depending upon the frequency of the stroke sensor output and serving as the relative stroke indicative signal. The output voltage of the frequency-voltage converter varies linearly with the relative displacement between the vehicle body and the wheel assembly, as shown in FIG. 6. Therefore, the output of the frequency-voltage converter serves as a relative distance indicative signal.

Figure 7:
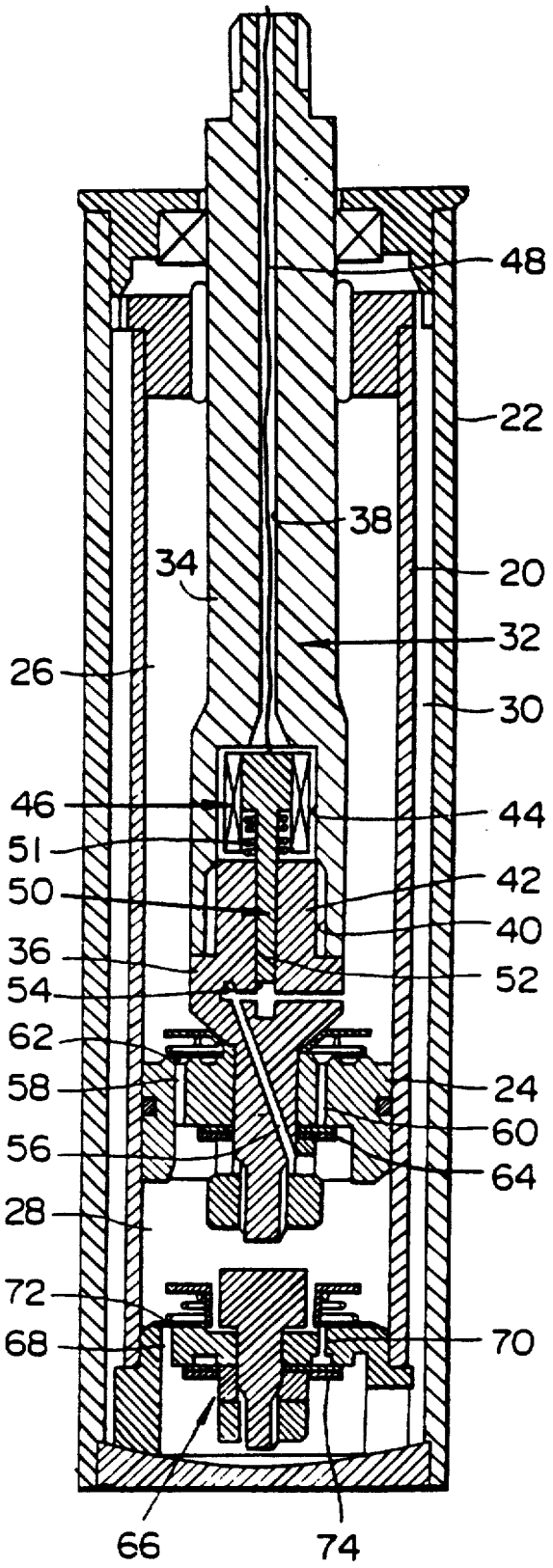
FIG. 7 is a longitudinal section through a shock absorber serving as a variable damper in the preferred embodiment of the suspension system.

In order to allow adjustment of the shock absorbing characteristics, the shock absorber 14 employed in the preferred embodiment generally comprises an inner and an outer hollow cylinders 20 and 22 arranged coaxially, and a piston 24 fitting flush within the hollow space in the inner cylinder 20, as shown in FIG. 7. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 is formed with an axially extending through opening 38.

The piston 24 defines flow-restrictive fluid passages 58 and 60. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valve 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The piston 24 has a central through opening 24a. Upper end of the opening 24a engages the lower end of the piston rod 32. The lower end of the opening 24a receives the upper end of a sleeve 52. The sleeve 52 has an axially extending bore 52a, which receives a flow control valve spool 55, and a plurality of radially extending orifices 54. The sleeve 52 is further formed with an annular groove 60b extending around its inner periphery. The radially extending orifices 54 open into the annular groove 60b. The outer ends of the orifices 54 opens toward the lower fluid chamber 28.

The valve spool 55 is formed with annular groove 60a on the outer periphery thereof. The annular groove 60a is in communication with the upper fluid chamber 26 through a fluid passage 56 defined through the piston body and the sleeve. The annular groove 60a is located at a vertical position at which it opposes the annular groove 60b of the sleeve 52 at the lower position of the spool and does not overlap the annular groove 60b at all at the upper position of the spool.

The spool 55 is normally biased upwards by means of a bias spring 46d of an actuator 46 which comprises an electromagnetic coil 46a housed in an enclosed casing 46b and a yoke 46c. The casing 46b engages the sleeve 52 at its upper end so that the actuator 46 can be firmly mounted on the piston 24. When the electromagnetic coil 46a is energized, it pulls the spool 55 downwardly to move the spool to its lower position.

When the spool is in the lower position, fluid can flow between the upper and lower fluid chambers 26 and 28 through the fluid passage 56, the grooves 60a and 60b and orifices 54. Therefore, the total flow area for fluid communication between the upper and lower chambers 26 and 28 is increased. As a result, there is less resistance to flow, which softens the damping characteristics of the vehicle. On the other hand, when the spool is in the upper shown in FIG. 4, fluid communication between the upper and lower fluid chambers 26 and 28 through the fluid passage 56 is blocked. Therefore, at this position, fluid communication between the upper and lower fluid chambers 26 and 28 is possible only by way of the fluid passages 56 and 58. Thus, the fluid flow area is decreased so as to exert higher resistance to fluid flow. Therefore, the damping force of the shock absorber 14 is increased.

Figure 8:
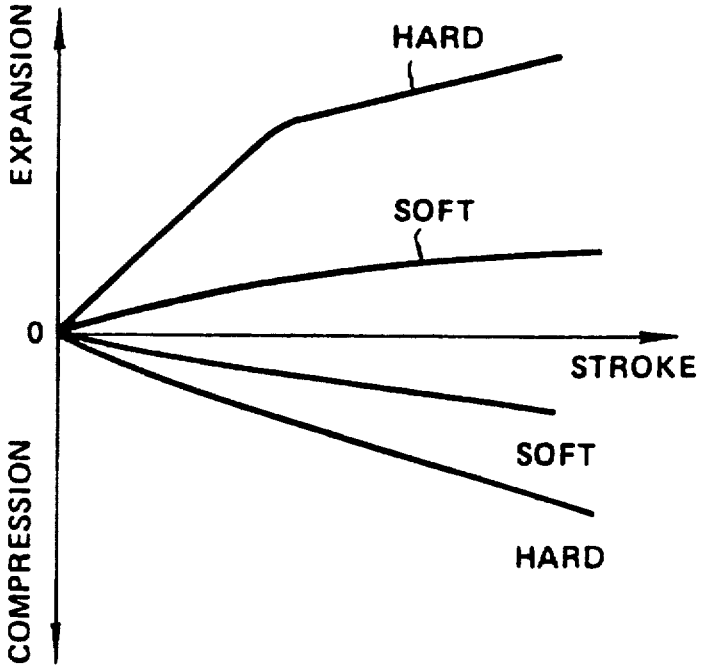
FIG. 8 is a graph of the damping force produced by the shock absorber in SOFT mode and in HARD mode.

As will be appreciated herefrom, when the controller 100 orders SOFT mode, the actuator 46 is energized to lower the spool to establish fluid communication between the upper and lower fluid chambers 26 and 28 through the fluid passage 56. On the other hand, when the controller 100 orders HARD mode, the actuator 46 is deenergized to move the spool 55 to its upper position by means of the bias spring 46d. Thus, fluid communication between the upper and lower fluid chambers 26 and 28 via the fluid passage 56 is blocked. Therefore, according to the preferred embodiment of the shock absorber of FIG. 7, the damping characteristics can be varied as illustrated in FIG. 8.

Figure 9:
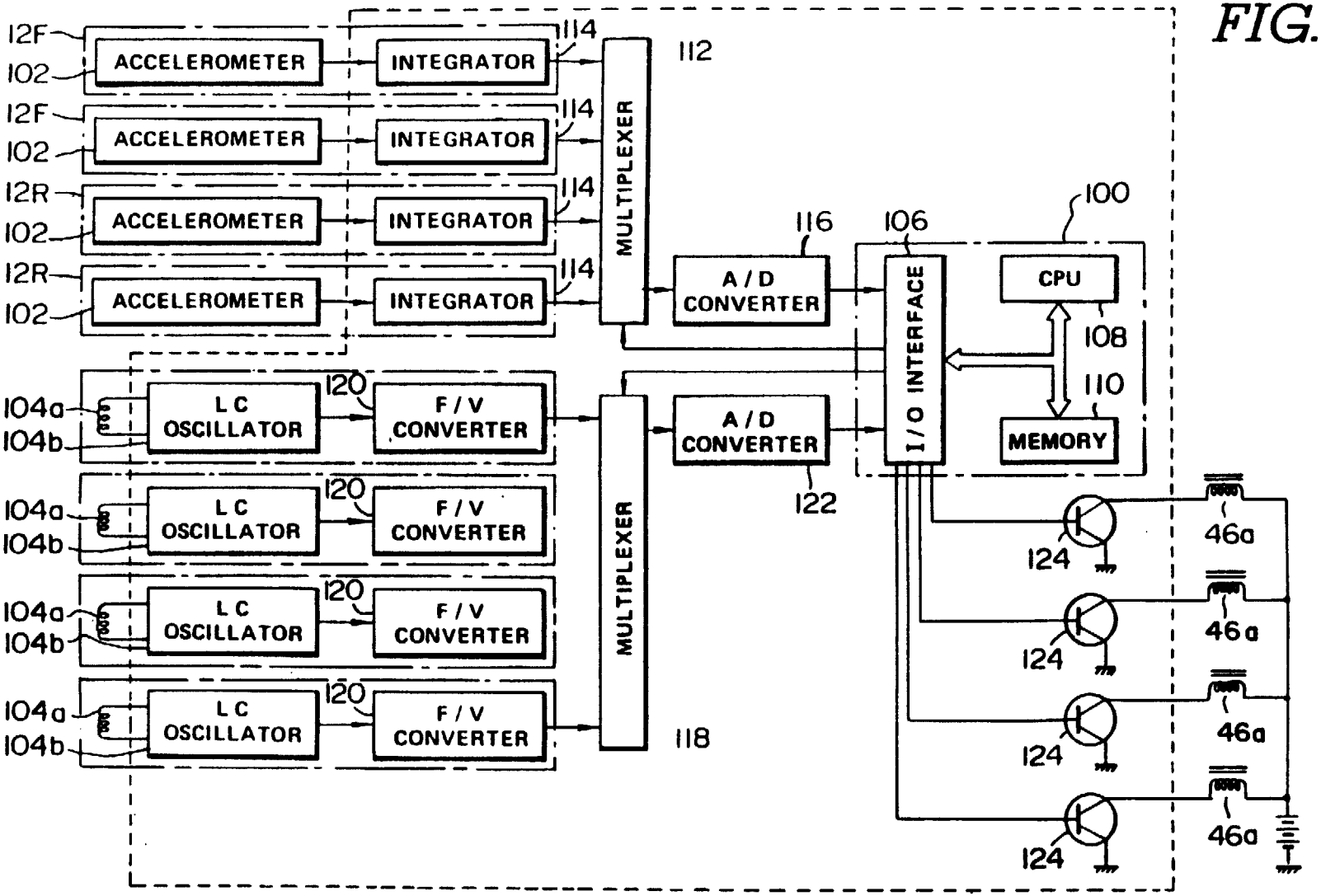
FIG. 9 is a block diagram of the first embodiment of a suspension control system according to the present invention.

FIG. 9 shows the preferred embodiment of the suspension control system in accordance with the present invention. As will be seen from FIG. 9, the controller 100 comprises a microprocessor including an input/output (I/O) interface 106, a central processing unit 108 and a memory 110.

Each of the accelerometers 102 is connected for output to a multiplexer 112 through an integrator 114. Each integrator 114 receives the output of the corresponding accelerometer 102 and integrates the output values to produce an integrated signal representative of the vertical speed of the vehicle body. The multiplexer 114 is, in turn, connected for output to the I/O interface 106 through an analog-to-digital (A/D) converter 116 to selectively supply one of the vertical speed indicative signals from one of the accelerometers 102 to the I/O interface through the A/S converter.

Similarly, each of the stroke sensors 104 is connected for output to a multiplexer 118 through frequency-to-voltage (F/V) converter 120. As set out above, since the LC oscillator 104b outputs a frequency signal depending upon the resistance of the sensor electrode 104a, the analog output of the F/V converter serves as the relative displacement indicative signal indicating piston rod stroke and, in turn, relative displacement of the vehicle body and wheel assembly. The multiplexer 118 is connected to the I/O interface 106 through another analog to digital (A/D) converter 122 to selectively supply one of the relative displacement indicative signals to the I/O interface 106 through the A/D converter.

The multiplexers 112 and 118 also receive address signals from the controller 100 through the I/O interface. The address signals respectively identify one of the accelerometers 102 and one of the stroke sensors 104 to be sampled. In order to control the damping characteristics of each of the suspension assemblies independently of the others, the address signals identifies the accelerometer 102 and the stroke sensor 104 associated with the same suspension assembly.

In addition, the I/O interface 106 is connected for output to the base electrodes of power transistors 122. The collector electrodes of the power transistors 122 are connected to respectively corresponding actuator coils 46a so as to energize and deenergize the latter according to control signals from the controller 100 and thereby switch the damping characteristics between HARD and SOFT modes.

Figure 10:
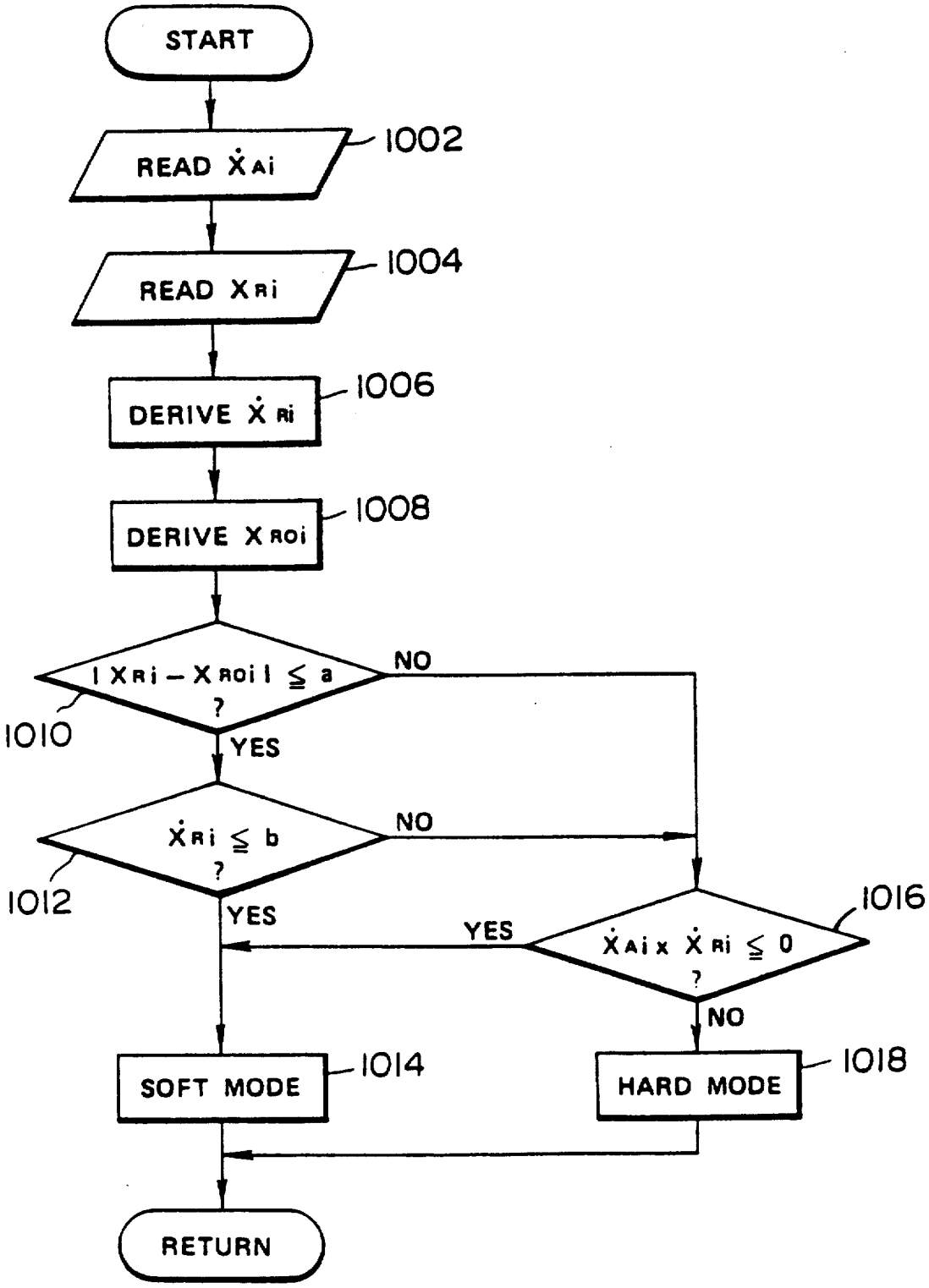
FIG. 10 is a flowchart of an anti-dive suspension control program to be executed in the control system of FIG. 4.

The CPU 108 of the controller 100 executes a control program which is illustrated in FIG. 10 to perform damping characteristics-dependent suspension control along the outlines set out with respect to FIGS. 1 and 2. In the control program, the vertical velocity indicative signal value $\dot{X}_{ai}$ is read at a step 1002 and the relative displacement indicative signal value $X_{Ri}$ is read out at a step 1004, with respect to a selected suspension assembly. At a step 1006, the relative displacement indicative signal value $X_{Ri}$ is differentiated to derive the relative speed $\dot{X}_{Ri}$. At a step 1008, an average value of the relative displacement indicative signal value $X_{Ri}$ representative of the dimensional relationship between the vehicle body and the wheel assembly is updated by utilizing the relative displacement indicative signal value $X_{Ri}$ read in the step 1004. The average value derived in the step 1008 will be hereafter referred to as neutral position indicative value $X_{ROi}$.

The difference between the relative displacement indicative signal value $X_{Ri}$ and the neutral position indicative value $X_{ROi}$ is checked in step 1010 against a predetermined reference value a which is relatively small and represenative of a stroke-dependent control criterion. If the difference is equal to or less than the reference value a when checked at the step 1010, the relative speed $\dot{X}_{Ri}$ is compared at a step 1012 to a predetermined reference value b which is also relatively small and representative of a relative speed criterion which triggers suspension control when exceeded by the relative speed. If the relative speed $\dot{X}_{Ri}$ is equal to or less than the reference value b, then the control signal is held LOW to leave the actuator coil 46a deenergized and so keep the damping characteristics of the shock absorber 14 in SOFT mode, at a step 1014.

On the other hand, if the difference ($|X_{Ri}-X_{ROi}|$) is greater than the reference value a or if the relative speed $\dot{X}_{Ri}$ is greater than the reference value b, the process goes to a step 1016 wherein the vertical velocity indicative signal value $\dot{X}_{Ai}$ is multiplied by the relative speed $\dot{X}_{Ri}$. The product of multiplication of the vertical velocity indicative value $\dot{X}_{Ai}$ and the relative speed $\dot{X}_{ROi}$ is checked with respect to zero. If the product ($\dot{X}_{Ai}\times\dot{X}_{ROi}$) is greater than zero, the control signal goes HIGH to energize the actuator coil 46a and so harden the shock absorber 14 in a step 1018. On the other hand, when the product ($\dot{X}_{Ai}\times\dot{X}_{ROi}$) is equal to or less than zero, control passes to the step 1014 to soften the shock absorber 14.

Figures 11A, 11B, 11C, 11D:
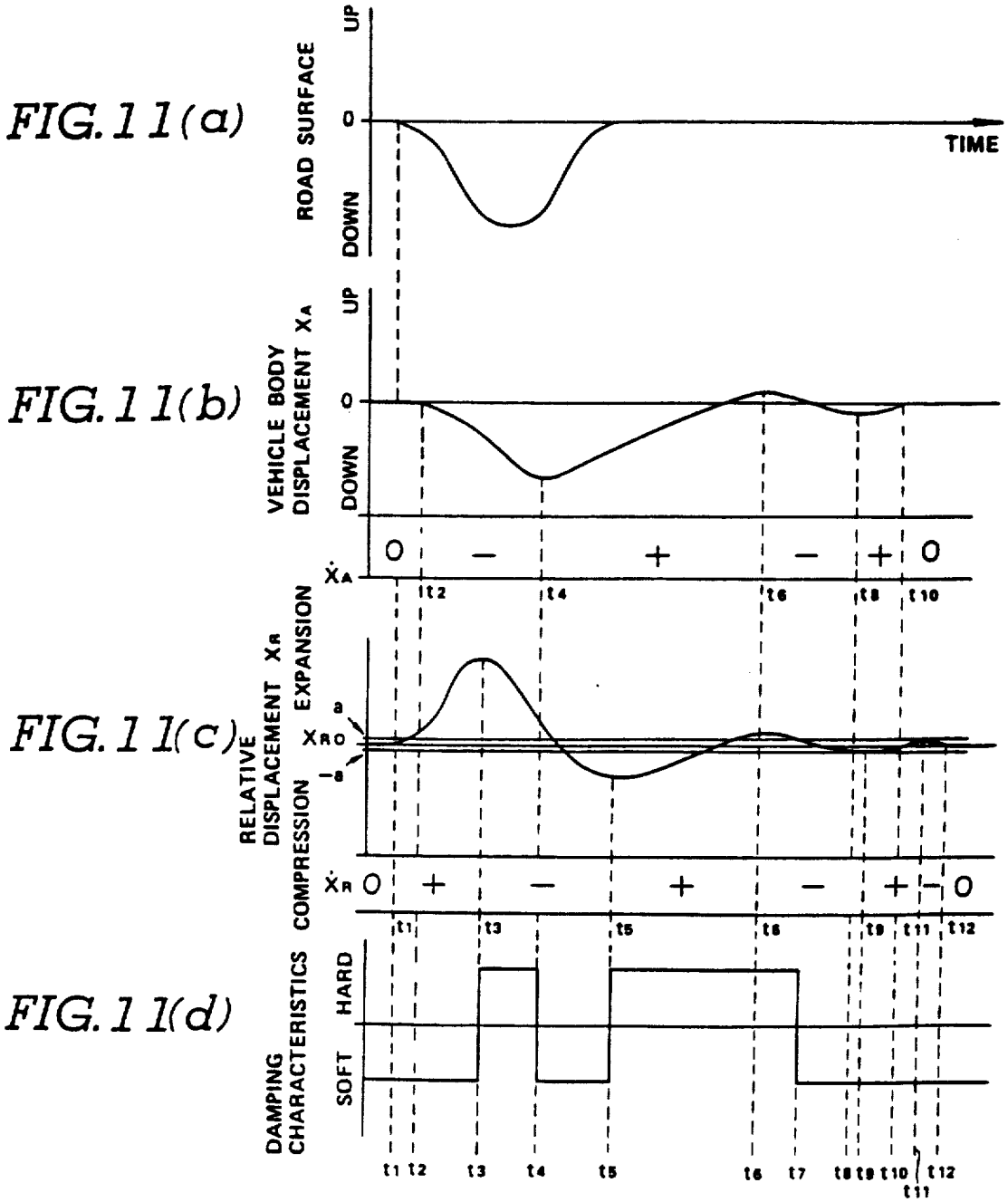
FIG. 11 is a timer chart showing one example of the operation of the suspension control system of FIG. 4.

The timing chart of FIG. 11 shows an example of suspension control operation performed by the preferred embodiment of the suspension control system according to the invention. The shown example is directed toward suppression of the vehicle body vibration upon bottoming while traveling along an essentially smooth road. In FIG. 11, the chart (a) represents the road surface profile, which has a dent or hole causing bottoming of at least one of the suspension systems. The chart (b) shows displacement of the vehicle body, the chart (c) shows relative displacement between the vehicle body and the wheel assembly, and the chart (d) shows the control signal level for switching the shock absorber damping characteristics between SOFT mode and HARD mode.

As can be seen from the charts (a) and (b), at least one of the vehicular wheels reaches the leading edge of the dent or hole on the road at a time $t_1$. Then, the corresponding wheel moves downward along the dent or hole. Accordingly, the corresponding part of the vehicle body drops in elevation after a certain delay time, say from a time $t_2$. The accelerometer 102 detects this downward movement and outputs an acceleration indicative signal $S_a$ with a negative value.

On the other hand, from the time $t_1$, the relative distance between the vehicle body and the wheel assembly expands due to expansion of the shock absorber. As a result, the positive value of the relative distance indicative signal from the F/V converter 120 increases.

At a time $t_3$, the wheel reaches the bottom of the dent or hole and thereafter gradually moves upwardly along the dent or hole. Thereafter, the relative distance between the vehicle body and the wheel assembly gradually drops. Slightly after the time $t_3$, the vehicle body movement switches from downward movement to upward movement. The vehicle body rebounds past its rest position and reaches a rebounding peak at a time $t_6$ and similarly reaches the bottom of the next bounding trough at a time $t_8$. During such vehicle body bounding and rebounding motion due to bottoming, the relative distance between the vehicle body and the wheel assembly varies as shown in the chart (c). Specifically, at a time $t_5$ between the times $t_4$ and $t_6$, the relative distance is minimized and at the time $t_6$, the relative distance is again maximized.

In the period between the times $t_2$ and $t_4$ while the vehicle body is moving downward, the vehicle body acceleration indicative signal value from the accelerometer 102 remains negative. On the other hand, during the period between $t_1$ and $t_3$, the relative speed indicative value derived by differentiating the relative distance indicative signal value remains positive. Therefore, the damping force produced by the shock absorber is recognized to tend to amplify the vibration during the period between $t_1$ and $t_3$. Therefore, during this period, the shock absorber is heled in SOFT mode. On the other hand, during the period between $t_3$ and $t_4$, it is recognized that the damping force of the shock absorber will tend to suppress or absorb vehicle body vibration. Therefore, in this period, the shock absorber is operated in HARD mode.

Similarly, during the period between $t_4$ and $t_5$, it is recognized that the damping force may amplify the vehicle body vibration. Therefore, the shock absorber is softened over this period. On ther other hand, during the period $t_5$ and $t_6$, the shock absorber is operated in HARD mode since the damping force will tend to suppress the vehicle body vibration.

Figure 12:
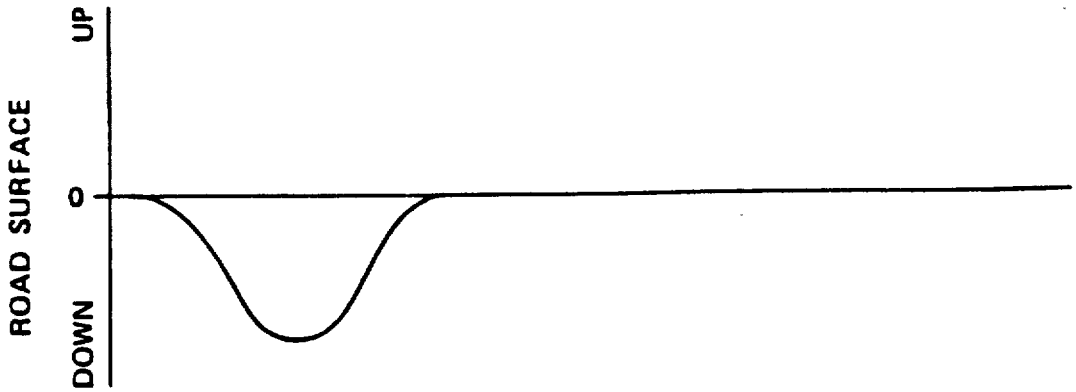
FIG. 12 is a graph showing the effect of the preferred embodiment of the suspension control system of FIG. 9 in comparison with the vibration suppressing characteristics resulting from fixing the damping characteristics in either HARD or SOFT mode.
Figure 12:
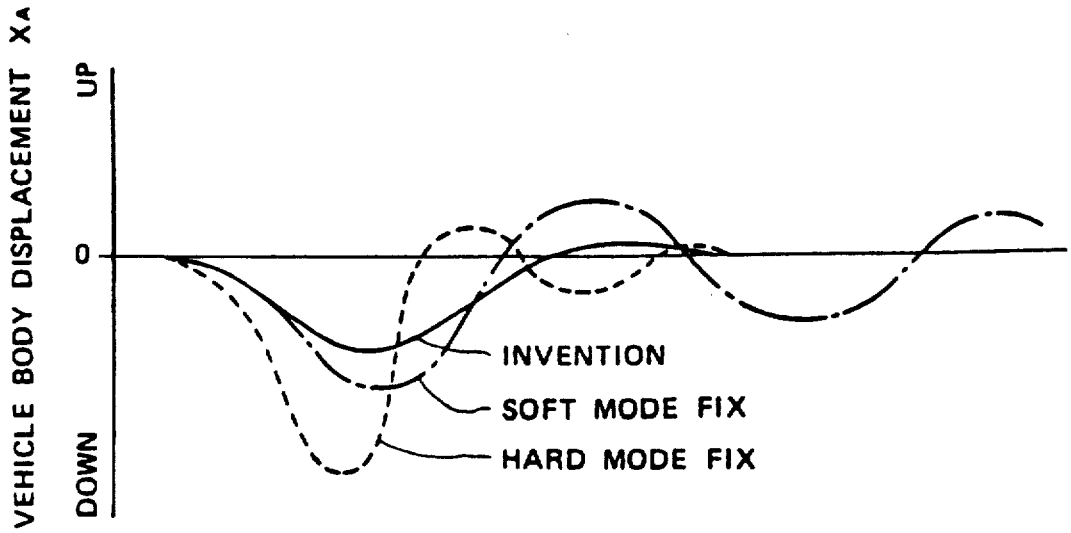
Figure 13:
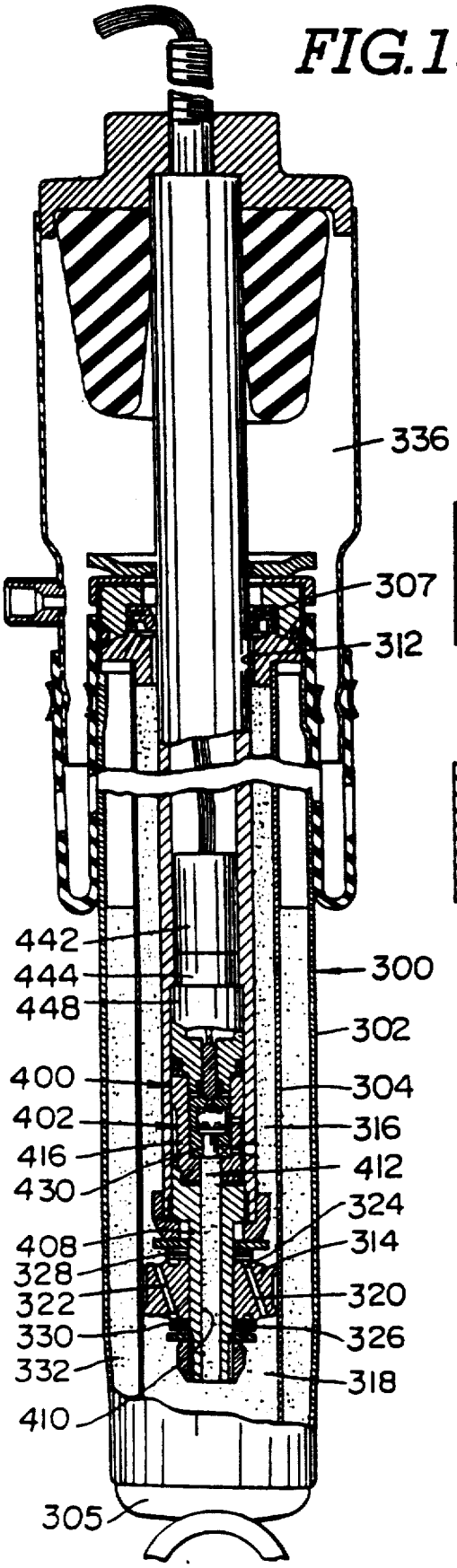
FIG. 13 is a longitudinal section through a modified shock absorber adapted to carry out suspension control according to the present invention.

As will be appreciated herefrom, according to the shown embodiment, vibration of the vehicle body due to bounding and rebounding of the suspension system will be satisfactorily and effectively suppressed. FIG. 12 compares the vibration suppressing effect of the preferred embodiment of the suspension control system to that of a suspension control in which the damping characteristics are fixed in either HARD mode or SOFT mode. As will be appreciated from FIG. 12, the preferred embodiment effectively suppresses vehicle body vibration and thus ensures riding comfort.

As set forth, the shown embodiment employs two-way adjustable shock absorbers, so that vibration suppressive suspension control is performed in either HARD mode or SOFT mode. However, it would be possible to control the suspension to suppress vehicle body oscillation by means of a three-way adjustable shock absorber which can operate in HARD mode. SOFT mode or MEDIUM mode wherein the damping characteristics of the suspension are intermediate the HARD mode and the SOFT mode. An example of a three-way adjustable shock absorber will be described herebelow with reference to FIGS. 13 to 17.

The hydraulic shock absorber 14 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 has fluid passages 320 and 322 connecting the upper and lower fluid chambers 316 and 318. The piston 314 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the groove 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the refernece numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e. HARD mode. MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 14:
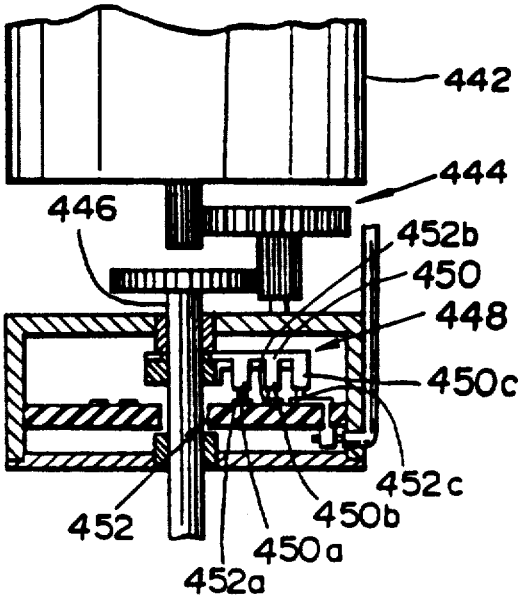
FIG. 14 is an enlarged section through the major part of the shock absorber of FIG. 13.

As shown in FIG. 14, the piston rod 308 defines an axial through opening 404 with the lower end opening into the lower fluid chamber 318. A fitting 408 seals the lower end of the openings 404 of the piston rod and has axial through opening 410, the axis of which is parallel to the axis of the through opening 404 of the piston rod. Thus, the through openings 404 and 410 constitute a fluid path 412 extending through the piston rod. The piston rod 308 also has one or more radial orifices or openings 414 opening into the upper fluid chamber 316. Thus, the upper and lower fluid chambers 316 and 318 are in communication through the fluid path 412 and the radial orifices 414.

A stationary valve members 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 so as to define an annular chamber 422 in conjunction with the inner periphery of the through opening 404 of the piston rod. The stationary valve member 416 has two sets of radial orifices 424 and 426 and an internal space 428. The radial orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radial orifices 432 and 434 are defined in the rotary valve member 430 at positions opposite the orifices 424 and 426 of the stationary valve member 416.

Figure 16:
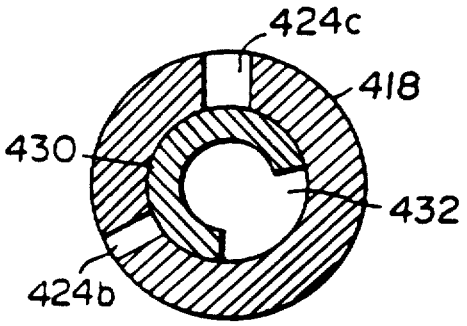
FIGS. 16 and 17 are cross sections taken respectively along lines XVI—XVI and XVII—XVII of FIG. 14.
Figure 17:
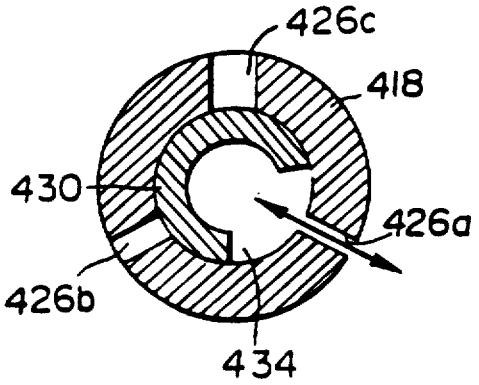

As shown in FIGS. 16 and 17, the orifices 424 and 426 respectively include first, second and third orifices 424a, 424b, 424c, and 426b, 426c. The first orifice 424a has the narrowest cross-sections and the orifice 432 is adapted to be in alignment with the first orifice to establish fluid communication between the upper and lower fluid chambers 316 and 318 in the case of the HARD mode. The third orifice 424c and 426c have the widest cross-sections and the orifices 432 and 434 are adapted to be in alignment with the third orifices in the case of the SOFT mode. The cross-sections of the second orifices 424b and 426b are intermediate those of the first and third orifices and the orifices 432 and 434 are adapted to align therewith in the case of the MEDIUM mode.

A check valve 436 is built into the internal space of the rotary valve member 430. The check valve 436 is normally biased towards a valve seat 438 by means of a bias spring 440 to allow one-way fluid flow from the lower fluid chamber to the upper fluid chamber. This causes the bound damping force to be somewhat weaker than the rebound damping force.

Figure 15:
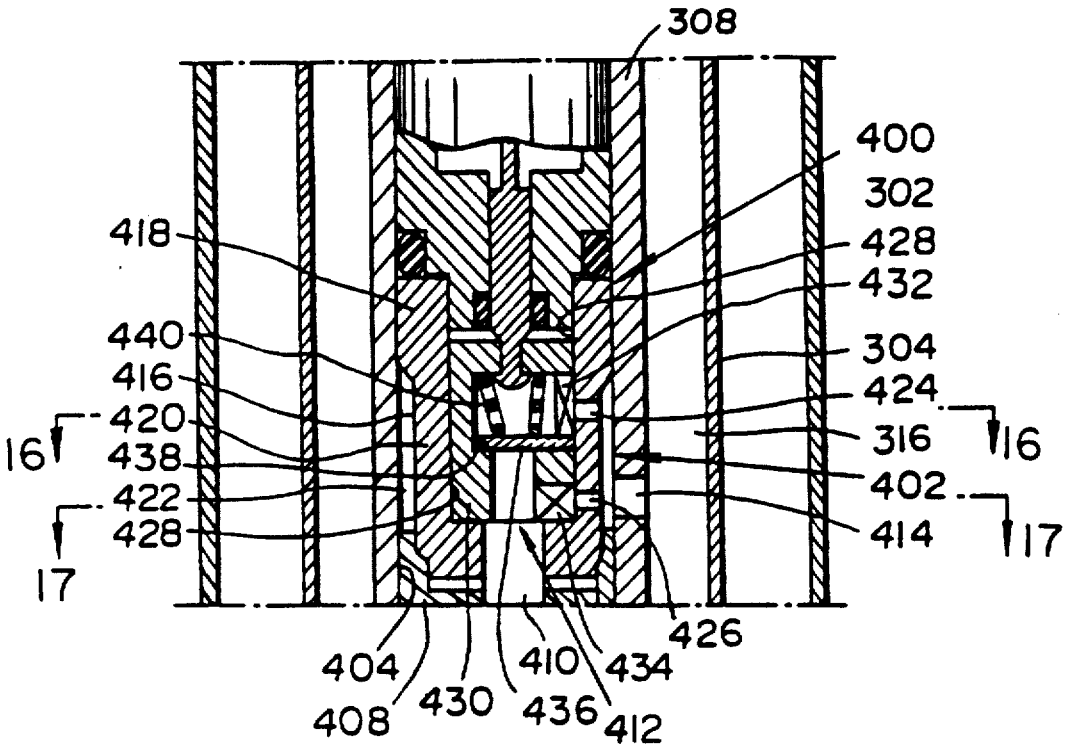
FIG. 15 is an enlarged section through a valve position sensor employed in the shock absorber of FIG. 13.

The rotary valve member 430 is associated with an electrically operable actuator such as an electrical stepper motor 442 through a differential gear unit 444 and an output shaft 446 as shown in FIG. 15. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal represenative of the rotary valve position and thus indicative of the selected mode of the damping force adjusting mechanism. The stepper motor 442 is electrically connected to a controller 100 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 13, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping froce adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIGS. 16 and 17, which illustrate the HARD mode. In this case, the orifice 432 of the rotary valve 430 is not alignment with either of the orifices 424b or 424c and the orifices 434 is in alignment with the smallest orifice 426a. During vehicle rebounding motion, i.e., in the piston compression stroke, the fluid flows from the upper fluid chamber 316 to the lower fluid chamber 318 though the orifice 426a. Similarly, during vehicle bounding motion, the fluid flows from the lower fluid chamber 318 to the upper fluid chamber 316 through orifice 426a. Since the first orifice 426a is the narrowest, the damping force produced in this mode is the highest among the three selectable modes.

In case of the MEDIUM mode, the orifice 432 and 434 of the rotary valve member 430 are respectively in alignment with the second orifices 424b and 426b.

In case of the SOFT mode, the orifices 432 and 434 align with the third orifices 424c and 426c, respectively to facilitate fluid flow. Since the third orifices 424c and 426c are the widest of the three sets, as described above, the damping force created in this SOFT mode is the lowest.

According to the shown embodiment, the electric stepper motor 442 is connected to the controller 100 through the driver circuit 16. Similarly to the case of the two-way shock absorber, the controller 100 selects the appropriate damping force state in accordance with detected road surface conditions but in this case produces a three-way control signal which orders the shock absorber to one of the SOFT, MEDIUM and HARD modes. The driver circuit 16 is responsive to the control signal to drive the stepper motor 442 to turn the rotary valve member 430 to the corresponding valve position.

In the preferred vibration suppressive suspension control, HARD or MEDIUM mode is used when stiffer suspension is ordered. MEDIUM mode or SOFT mode IS selectively used in all cases referred to as SOFT mode in the preceding first embodiment depending upon various preselected control parameters.

It should be noted that though the suspension control system according to the present invention has been described hereabove to control variable damping characteristics shock absorber, damping characteristics of the suspension system can be controlled in various ways. Examples of other suspension control systems which can perform vibration suppressive suspension control will be described herebelow.

Figure 18:
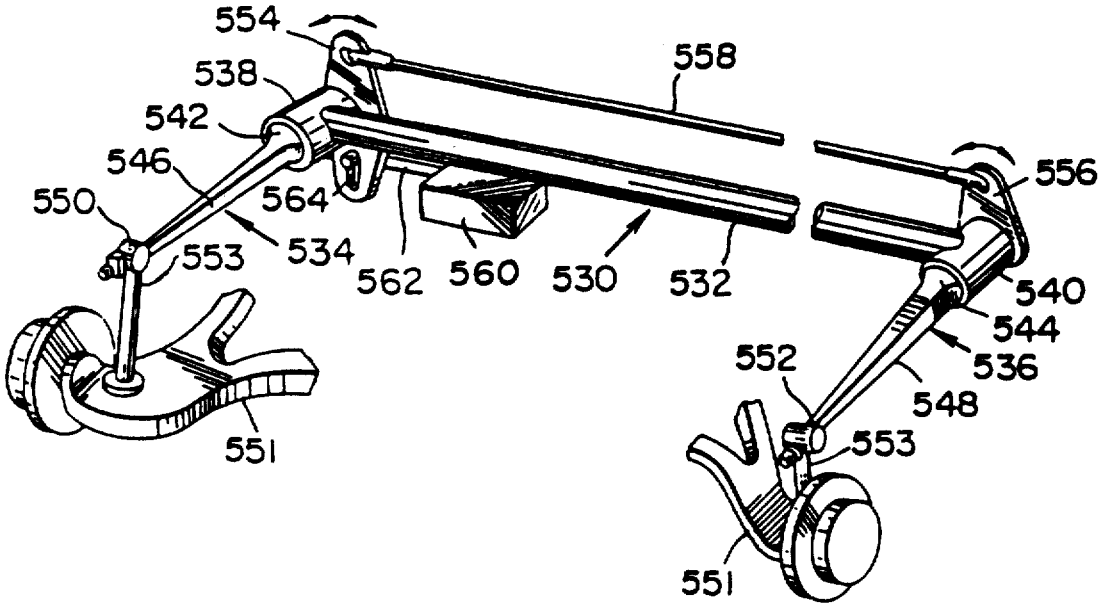
FIG. 18 is a perspective illustration of a stabilizer which constitutes the second embodiment of the suspension control system according to the invention.
Figure 19:
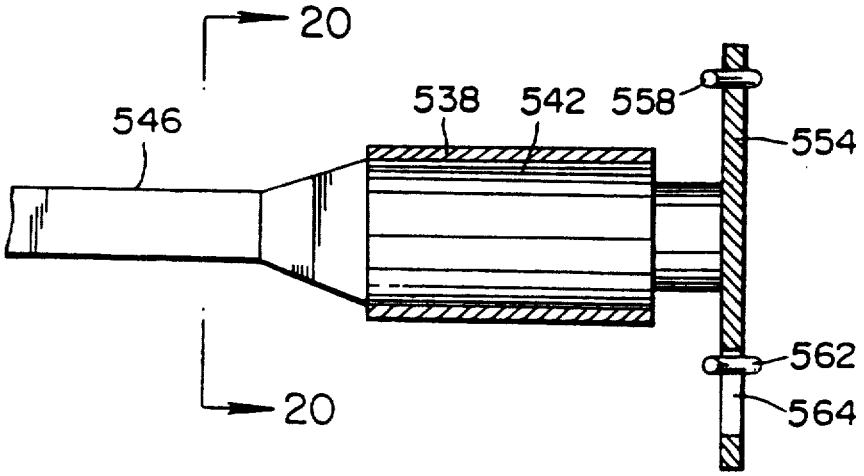
FIG. 19 is an enlarged section through a major part of the stabilizer of FIG. 18.
Figure 20:
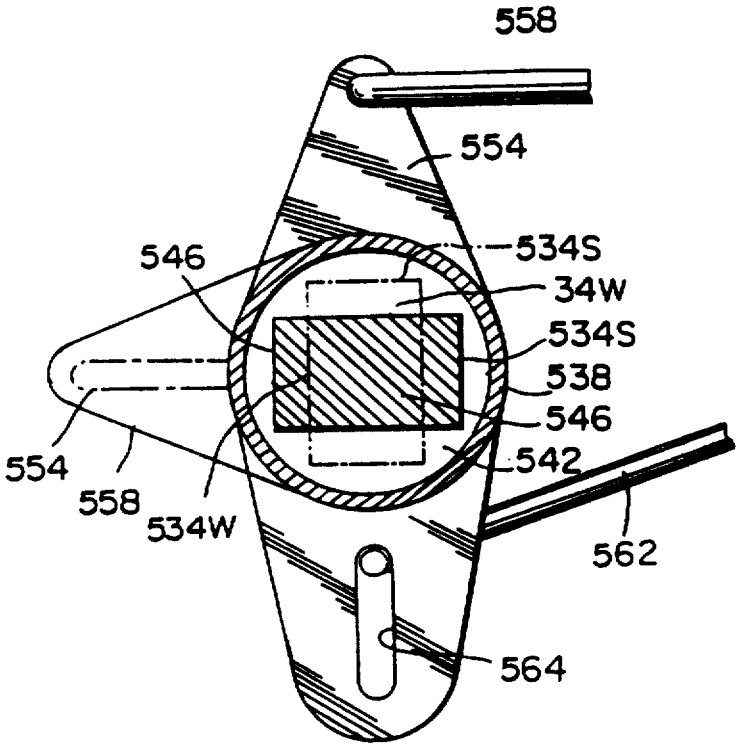
FIG. 20 is a cross-section taken along line XX—XX of FIG. 19.

FIGS. 18 to 20 show the structure of a roll stabilizer 530 controlled by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearings 538 and 540 at both ends. The parallel bar sections 534 and 536 have end segments 542 and 544 of circular cross-section bar section 532 and a pair of parallel bar sections 534 and 536. The transverse bar section 532 extends essentially perpendicular to the vehicle axis and has a circular cross-section. The transverse bar section 532 is connected to hollow cylindrical bearings 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearings 538 and 540. Link plates 554 and 556 are rigidly fitted onto the protruding ends of the parallel bar sections 534 and 536. The link plates 554 and 556 are rotatable about the bearings 538 and 540 together with the parallel bar sections 534 and 536. The link plates are connected to each other through a linkage 558. In addition, the link plate 544 is associated with an actuator 560 through an actuation rod 562 engaging an elongated opening 564 of the link plate 554. The actuator 560 may comprise an electromagnetically operative solenoid. The actuator is energized by a control signal from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 536 through 90° within the bearing 540.

As shown in FIG. 20, at the neutral position, the parallel bar sections 534 and 536 lie with their wider sides 534W (536W) horizontal. In this position, since the resistance of the parallel bar sections 534 and 536 to the vertical bending moment applied when the vehicle wheel bounds are rebounds is relatively small, the torsion on the transverse bar section 532 of the stabilizer 530 is small. When the actuator 560 is energized, the parallel bar sections 534 and 536 are rotated to lie with their shorter sides 534S (536S) horizontal, as shown in phantom line in FIG. 20. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the SOFT MODE order is maintained.

When the HARD mode is ordered, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress bounding and rebounding motion of the vehicle body.

Figure 21:
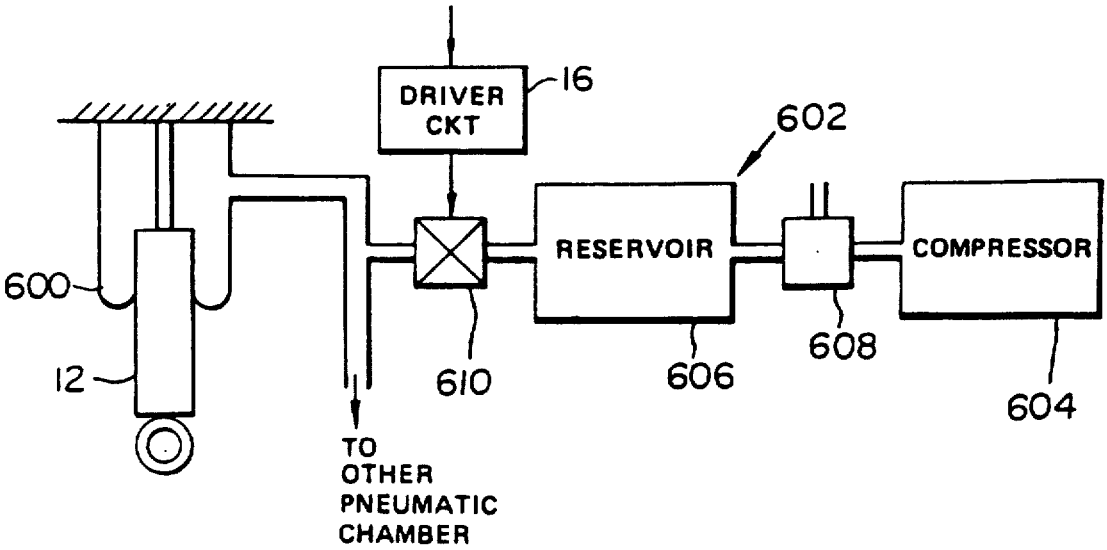
FIG. 21 is a schematic diagram of a vehicle height regulator system which controls vehicular height by controlling pneumatic pressure in a pneumatic chamber and which constitutes the third embodiment of the suspension control system of the invention.

FIG. 21 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the inducation valve 608 to adjust the fluid pressure in the pneumatic chamber 600 in accordance with vehicle driving conditions.

According to the shown embodiment, the driver circuit 16 may be connected to the control system of the first embodiment so that it is activated in response to vehicle body vertical velocity indicative signal and relative displacement speed indicative signal. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of the pneumatic chamber and a smaller volume is achieved by blocking fluid communications between the pneumatic chamber and the fluid reservoir, the pneumatic chamber becomes relatively rigid in this case, providing a larger damping force in response to nose-dive, which is detected in the manner set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The suspension system structure of FIG. 17 has been disclosed in U.S. Pat. No. 4,349,077 to Sekiguchi et al. and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European patent application No. 84100729.7. filed on Jan. 24, 1984. The contents of the above-identified U.S. Patents and the co-pending applications are hereby incorporated by reference.

Vibration suppressive suspension control can also be achieved with this suspension system in substantially the same way as described in the first embodiment of the invention. For instance, when the magnitude and rate of change of the vehicle height exceeds their criteria, the pressure control valve 610 is closed to block fluid communication between the pneumatic chamber 600 and the reservoir in order to increase the stiffness of the strut assembly and so produce a greater damping force with which to suppress vibration of the vehicle body. On the other hand, under normal driving conditions, the pressure control valve 610 remains open, allowing fluid communications between the pneumatic chamber and the reservoir chamber. As a result, sufficiently soft shock-absorbing characteristics can be provided to ensure good riding comfort.

As set forth above, according to the present invention, the vehicular suspension system can provide both riding comfort and good drivability by controlling hardness of the suspension depending upon the expected effect of the damping characteristics.

While the specific embodiments have been disclosed in order to facilitate better understanding of the invention, it should be noted that the invention can be embodied in various ways other than those illustrated hereinabove. Therefore, the invention should be understood to include all possible embodiments and modifications to the embodiments which can be embodied without departing from the principles of the invention, which are set out in the appended claims.

What is claimed is:

1. A suspension control system for an automotive vehicle comprising:

a vehicular suspension system with damping characteristics variable at least between a first harder suspension mode and a second softer suspension mode;

a first sensor means for monitoring vertical displacement of a vehicle body within a gravity field and producing a first sensor signal indicative of the vertical speed of said vehicle body;

a second sensor means for monitoring relative distance between the vehicle body and a vehicular wheel assembly and producing a second sensor signal indicative of the relative speed between said vehicle body and said wheel assembly;

a controller responsive to said first and second sensor signals for predicting the effect of damping characteristics of the suspension system [from] between a first condition in which said damping characteristics of the suspension system act to amplify vehicle body vibrations and a second condition in which damping characteristics of the suspension system act to absorb vehicle body vibrations, said controller causing said vehicular suspension system to assume said second softer suspension mode when said first condition is predicted and to assume said first harder suspension mode when said second condition is predicted; *and*

*means responsive to said second sensor signal for selectively enabling and disabling operation of said controller for varying damping characteristics depending upon a predetermined magnitude of relative speed.*

2. The suspension control system as set forth in claim 1, wherein said first sensor means comprises a sensor adapted to detect acceleration of the vehicle body and [producing] *produce* an acceleration indicative signal.

3. The suspension control system as set forth in claim 2, wherein said second sensor means comprises a sensor adapted to monitor relative displacement between said vehicle body and said wheel assembly, an integrator for integrating the relative displacement indicative output of said sensor and an arithmetic means for deriving said relative speed based on said integrated value by differentiating said integrated value.

4. The suspension control system as set forth in claim 3, wherein said suspension system comprises a hydraulic shock absorber with damping characteristics variable at least between said first mode and said second mode.

5. The suspension control system as set forth in claim 4, wherein said hydraulic shock absorber has upper and lower fluid chambers filled with a working fluid and of variable volumes according to a piston stroke, said shock absorber being provided with a flow control valve which is operable in either one of a first mode position, in which it restricts the rate of flow of working fluid between said upper and lower fluid chambers to a minimum rate, and a second mode position in which it allows fluid flow between said chambers at a maximum rate.

6. The suspension control system as set forth in claim 3, wherein said suspension system comprises a stabilizer with stiffness variable at least between said flow mode and said second mode.

7. The suspension control system as set forth in claim 3, wherein said suspension system comprises a pneumatic spring means exerting a pneumatic damping force variable at least between said first mode and said second mode.

8. In an automotive suspension system with damping characteristics variable at least between a first harder suspension mode and a second softer suspension mode, a process for suppressing vibration of a vehicle body comprising the steps of:

detecting the vertical speed of said vehicle body *using a first sensor and producing a first sensor signal indicative of said vertical speed;* detecting the relative speed between said vehicle body and a vehicular wheel assembly *using a second sensor and producing a second sensor signal indicative of relative speed;*

*using a controller for* predicting the effect of damping force produced by said suspension system based on said vehicle body speed and said relative speed [from] between a first condition in which damping characteristics act to amplify vehicle body vibrations, and a second condition in which damping characteristics of the suspension system act to absorb vehicle body vibrations; [and]

causing said vehicular suspension system to assume said second softer suspension mode when said first condition is detected, and to assume said first harder suspension mode when said second condition is detected*; and*

*responsive to said second sensor signal, selectively enabling and disabling operation of said controller for varying damping characteristics depending upon a predetermined magnitude of relative speed.*

9. The method as set forth in claim 8, wherein said first condition is *also* predicted when said vehicle body speed indicative value and said relative speed indicative value indicate action in the same direction and said second condition is predicted when said vehicle body speed indicative value and said relative speed indicative value indicate action in opposite directions.

10. The method as set forth in claim 9, wherein said actuating step is performed by adjusting the damping characteristics of a shock abosrber in the suspension system between a soft mode and a hard mode.

11. A suspension control system for an automotive vehicle comprising:

a vehicular suspension system with damping characteristics variable at least between a first harder suspension mode and a second softer suspension mode;

a first sensor means for monitoring vertical displacement direction and speed of a vehicle body within a gravity field and producing a first sensor signal indicative of the direction of motion of the vehicle body in bounding and rebounding directions, and further indicative of the vertical speed of said vehicle body;

a second sensor means for monitoring relative direction of relative motion, and relative speed of motion between the vehicle body and a vehicular wheel assembly and producing a second sensor signal indicative of the direction of relative motion between the vehicle body and the vehicular wheel in bounding or rebounding directions, *relative displacement between the vehicle body and the wheel*

*assembly* and the relative speed of motion between said vehicle body and said wheel assembly;

a controller responsive to said first and second sensor signals for predicting the effect of damping characteristics of the suspension system depending on the direction of motion of said vehicle body and the direction of relative motion of said vehicle body and said vehicular wheels [from] between a first condition in which said damping characteristics of the suspension system act to [absorb] *amplify* vehicle body vibrations and a second condition in which said damping characteristics of the suspension system act to absorb vehicle body vibrations, said controller causing said vehicular suspension system to assume said second softer suspension mode when said first condition is predicted and to assume said first harder suspension mode when said second condition is predicted*; and*

*means responsive to said second sensor signal for selectively enabling and disabling operation of said controller for varying damping characteristics depending upon a predetermined magnitude of relative displacement.*

12. In an automotive suspension system with damping characteristics variable at least between a first harder suspension mode and a second softer suspension mode, a process for suppressing vibration of a vehicle body comprising the steps of:

detecting direction and speed of vertical motion of said vehicle body and producing a first signal indicative of the direction and speed of said vertical motion;

detecting direction of relative motion and speed of relative motion between said vehicle body and a vehicular wheel assembly and producing a second signal indicative of the direction of relative motion and speed of relative motion between said vehicle body and said vehicular wheel assembly;

*using a controller for* predicting the effect of damping force produced by said suspension system based on said vehicle body speed and said relative speed by comparing the direction of said detected vertical motion of said vehicle body and the direction of said relative motion between said vehicle body and said vehicular wheel [from] between a first condition in which damping characteristics act to amplifying vehicle body vibrations and a second condition in which damping characteristics of the suspension system act to absorb vehicle body vibrations; and causing said vehicular suspension system to assume said second softer suspension mode when said first condition is detected, and to assume said first harder suspension mode when said second condition is detected*; and*

*responsive to said second signal, selectively enabling and disabling operation of said controller for varying damping characteristics depending upon a predetermined magnitude of relative displacement.*

*13. A suspension control system as set forth in claim 1 wherein said means for selectively enabling and disabling operation of said controller disables said operation of said controller when said relative speed is in a predetermined range having a limit defined by said predetermined magnitude.*

*14. A suspension control system as set forth in claim 1, wherein said controller derives a product of said vertical speed of said vehicle body and said relative speed and checks the polarity of said product for predicting said second softer suspension mode when the polarity of said product is negative.*

*15. A suspension control system as set forth in claim 1 wherein said suspension system includes a variable damping characteristics shock absorber with a rotary valve having at least two mutually different path area orifices for selective alignment with a fluid flow path for adjusting damping characteristics at least between said first harder suspension mode and said second softer suspension mode and wherein said controller causes said vehicular suspension system to assume said second softer suspension mode by driving said rotary valve to align one of said orifices having a greater path area when said first condition is predicted and to assume said first harder suspension mode by driving said rotary valve to align the other orifice having a smaller path area when said second condition is predicted.*

*16. A suspension control system as set forth in claim 1 wherein said second sensor means comprises a sensor for detecting relative distance between said vehicle body and said vehicular wheel assembly and means for differentiating the relative displacement.*

*17. A suspension control system as set forth in claim 1 wherein said second sensor means signal also represents relative displacement between said vehicle body and said wheel assembly and said means for enabling and disabling operation of said controller also enables or disables operation of said controller based upon a predetermined magnitude of relative displacement.*

*18. A suspension control system as set forth in claim 11 wherein said means for selectively enabling and disabling operation of said controller disables operation of said controller when said relative displacement is in a predetermined range having a limit defined by said predetermined magnitude.*

*19. A suspension control system as set forth in claim 18 wherein said means for selectively enabling and disabling operation of said controller disables operation of said controller when said relative displacement is within said range and said relative speed is in a predetermined range.*

*20. A suspension control system as set forth in claim 11 wherein said means for selectively enabling and disabling operation of said controller derives a reference value on the basis of said second sensor signal and periodically updates said reference value, derives a difference between an instantaneous relative displacement indicated by said second sensor signal and said reference value, compares said difference with said predetermined magnitude of relative distance and disables operation of said controller when said difference is less than said predetermined magnitude of relative displacement.*

*21. A suspension control system as set forth in claim 20 wherein said reference value is indicative of a relative distance between the vehicle body and the vehicular wheels at a neutral vehicular height position.*

*22. A suspension control system as set forth in claim 21 wherein said reference value is an average of a number of values of relative displacement determined based on said second sensor signal.*

*23. A suspension control system as set forth in claim 11 wherein said first sensor means comprises an acceleration sensor and an integrator for integrating the monitored vertical acceleration.*

*24. A suspension control system as set forth in claim 11, wherein said controller derives a product of said vertical speed of said vehicle body and said relative speed and checks the polarity of said product for predicting said sec-*

*ond softer suspension mode when the polarity of said product is negative.*

*25. A suspension control system as set forth in claim 11 wherein said suspension system includes a variable damping characteristics shock absorber with a rotary valve having at least two mutually different path area orifices for selective alignment with a fluid flow path for adjusting damping characteristics at least between said first harder suspension mode and said second softer suspension mode and wherein said controller causes said vehicular suspension system to assume said second softer suspension mode by driving said rotary valve to align one of said orifices having a greater path area when said first condition is predicted and to assume said first harder suspension mode by driving said rotary valve to align the other orifice having a smaller path area when said second condition is predicted.*

*26. A suspension control system as set forth in claim 1 wherein said first sensor means comprises an acceleration sensor and an integrator for integrating the monitored vertical acceleration.*

* * * * *